Oct. 13, 1942.  H. A. SCHRANTZ  2,298,596
STEERING WHEEL
Filed June 9, 1941
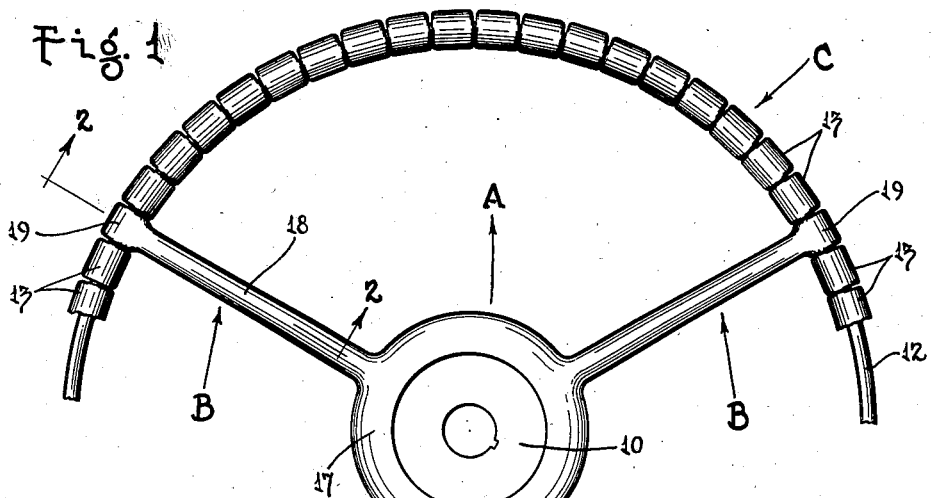
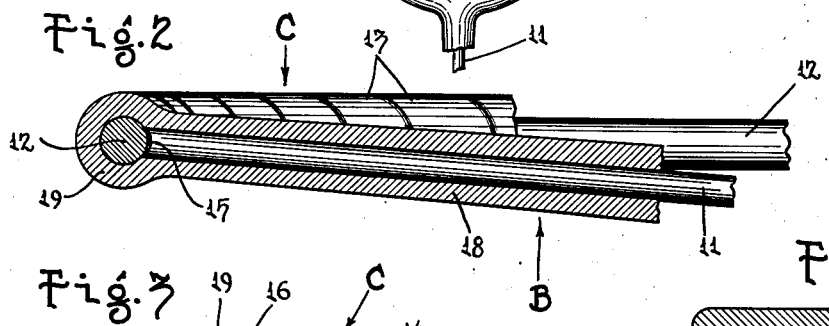
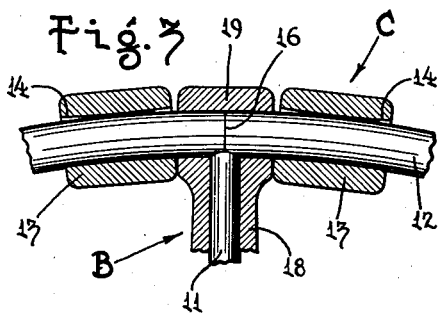
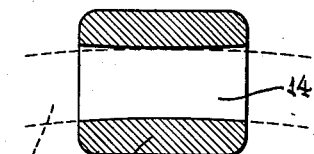
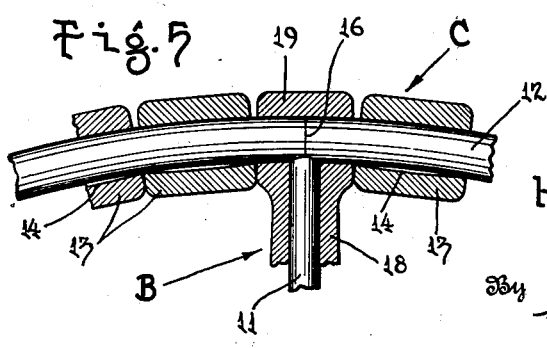
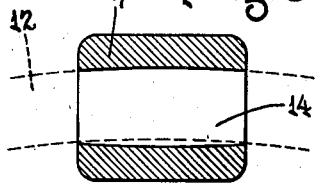
Inventor
Herbert A. Schrantz
By Canwell + Lagaard
Attorneys Patented Oct. 13, 1942

2,298,596

UNITED STATES PATENT OFFICE 2,298,596

STEERING WHEEL

Herbert A. Schrantz, St. Paul, Minn.

Application June 9, 1941, Serial No. 397,162

3 Claims. (Cl. 74—552)

My invention relates to improvements in steering wheels, an object thereof being to provide a simple, durable and relatively inexpensive handwheel for steering automobiles, trucks and other land-vehicles, water-craft, airplanes and the like in which revoluble grip-members are incorporated in the rim structure of the wheel to turn with the hand grasping the same, whereby loosening of the grip and slippage of the hands about the rim is avoided upon manipulation of the wheel by the operator.

Other objects of the invention reside in the novel combination and arrangement of parts and in the details of construction hereinafter illustrated and/or described.

In the accompanying drawing, Fig. 1 is a fragmentary plan view of a steering wheel embodying the present invention; Fig. 2 is a fragmentary sectional view somewhat enlarged over the scale shown in Fig. 1 and taken as on the line 2—2 of Fig. 1; Fig. 3 is a fragmentary sectional view, in detail, taken in the plane of the wheel and through the rim and one of the spokes at its junction with the rim; Fig. 4 is an enlarged axial sectional view of one of the grip-members shown in Fig. 3, said view including dotted lines illustrative of the core of the rim and Figs. 5 and 6 are views similar to Figs. 3 and 4, respectively, in which a modified form of grip member is shown.

Referring to the drawing, wherein similar parts are designated by similar reference characters throughout the several views, it will be seen that my improved steering wheel embodies a hub A, spokes B and rim C, said hub being adapted to be secured in conventional or any suitable manner to a steering-shaft (not shown) to be turned by said wheel.

The hub A includes a metallic core 10 and the spokes B include metallic rods or spoke-cores 11 issuing from said hub-core 10. The rim C includes a metallic rim-core 12 consisting of a rod, circular in cross-section, bent into the form of an annulus, said rim-core 12 being secured to the ends of the spokes B. The rim C further includes a plurality of preferably identical bead-like grip-members 13, preferably of a suitable plastic and preferably of generally cylindrical form having an axial bore 14 to receive the rim-core 12. A series of these grip-members 13 are strung upon each of the quadrants of the rim-core 12 between the spokes B of the wheel, the number of grip-members upon each quadrant depending upon the axial dimensions of said grip-members and being such that the grip-members abut one another in endwise relationship occupying the entire quadrant.

Grip-members of exceedingly short axial dimensions, substantially disc-like, for example, may have axial bores of uniform diameter closely approximating the cross-sectional diameter of the rim-core stock and yet be capable of being strung on the rim-core 12 and of turning thereon without skewing relative thereto. Such a bore, however, will not suffice in an axially elongated or cylindrical form of grip-member, as shown in the accompanying drawing and in most cases preferred over a disc-like form of grip-member, some provision being essential to admit of the stringing of grip-members 13 on the rim-core 12 and to bring about the coaction of such members with said rim-core 12, whereby the former may turn on the latter without lost-motion resulting in any appreciable skewing of the grip-members relative to the rim-core. One such suitable provision is afforded in the construction shown in Fig. 3 and Fig. 4, wherein the bore 14 of the grip-member 13 is constricted inwardly from the ends of said member and in such manner that the wall of said bore along a line from end to end thereof fits against the inside of the rim-core 12, while the wall of said bore at a point midway between its ends contacts the outside of said rim-core. Another suitable provision is afforded in the construction shown in Fig. 5 and Fig. 6, wherein the bore 14 of the grip-member 13 is progressively constricted outwardly toward the ends thereof in such manner that the wall of said bore along a line from end to end thereof fits against the outside of the rim-core 12, while the wall of said bore at points at its ends contacts the inside of said rim-core. Thus, in both of said constructions, the grip-members 13, while free to receive the rim-core 12, and rotate thereon are firmly held against endwise rocking or skewing movement relative thereto.

The ends of the spoke-cores 11 are notched, as at 15, Fig. 2, to receive portions of the inner side of the rim-core 12 upon which a predetermined number of grip-members 13 have been strung. These grip-members are equally distributed on the several quadrants of the rim-core 12 between the spoke-cores 11 and the joint 16 at the meeting ends of the stock forming the annular rim-core, is disposed at the notched end of one of said spoke-cores 11. Said meeting ends of the rim-core stock and the notched end of said spoke-core are then welded together, said rim-core being also welded to the notched ends of the other spoke-cores 11. Thereafter, the hub-core 10 and spoke-cores 11 are supplied with coverings 17, 18 of a suitable plastic, each spoke being provided with a cylindrical head 19 of such plastic substantially of the same diameter as that of the individual grip-members 13 and in axial coincidence with the axis of the rim-core stock, whereby a substantially unbroken bead-like appearance is presented by the grip-members 13 and spoke-heads 19. In this connection, it will be understood, of course, that the endmost grip-members 13 on each quadrant of the rim-core 12 will abut their adjacent spoke-heads 19 and that said endmost grip-members and the grip-members therebetween will abut each other.

In the use of a steering wheel constructed in accordance with my present invention, the grip of the operator's hands upon the rim C may remain firm at all times, the particular grip-members 13 grasped being free to turn on the rim-core 12 and eliminating any necessity of slipping the hands about the rim.

Changes in the specific form of my invention, as herein disclosed, may be made within the scope of what is claimed without departing from the spirit of my invention.

Having described my invention, what I claim as new and desire to protect by Letters Patent is:

1. In a steering wheel, an annular spoke-supported rim-core circular in cross-section, grip-members mounted on said rim-core, each grip-member being formed with an axial bore therein receiving the rim-core, the surface of each grip-member defining the bore therein being a surface with an arcuate element of generation, the curvature thereof conforming with the curvature of said rim-core and providing a free rotational fit between grip-member and rim-core devoid of lost-motion.

2. In a steering wheel, an annular spoke-supported rim-core circular in cross-section, grip-members mounted on said rim-core, each grip-member being formed with an axial bore therein receiving the rim-core, the surface of each grip-member defining the bore therein being a surface with an arcuate element of generation convex relative to the axis of the grip-member, the curvature thereof conforming with the innermost curvature of said rim-core and providing a free rotational fit between grip-member and rim-core devoid of lost-motion.

3. In a steering wheel, an annular spoke-supported rim-core circular in cross-section, grip-members mounted on said rim-core, each grip-member being formed with an axial bore therein receiving the rim-core, the surface of each grip-member defining the bore therein being a surface with an arcuate element of generation concave relative to the axis of the grip-member, the curvature thereof conforming with the outermost curvature of said rim-core and providing a free rotational fit between grip-member and rim-core deprived of lost-motion.

HERBERT A. SCHRANTZ.